March 17, 1964 R. J. CARLSON 3,125,711
SPEED CONTROLLER FOR INDUCTION MOTOR
Filed June 27, 1960 3 Sheets-Sheet 2
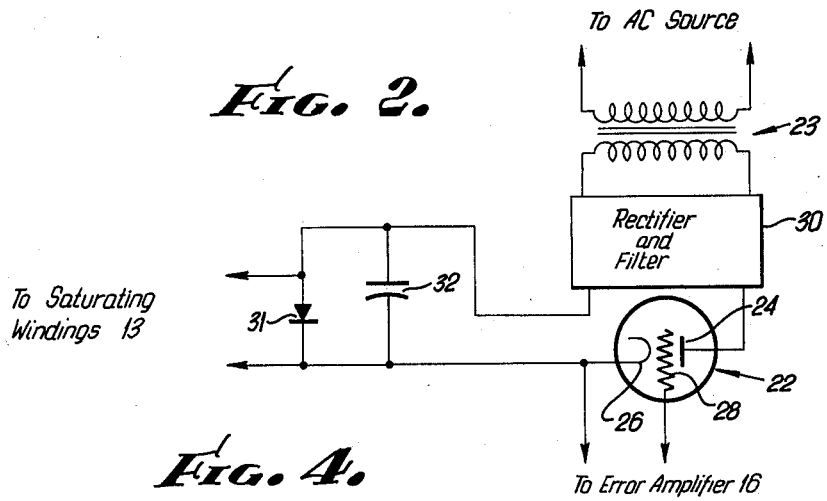
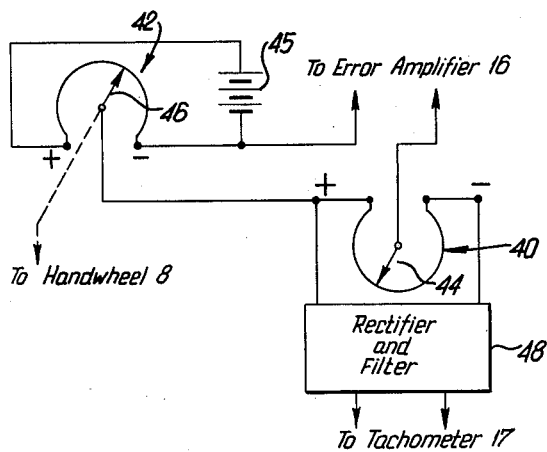
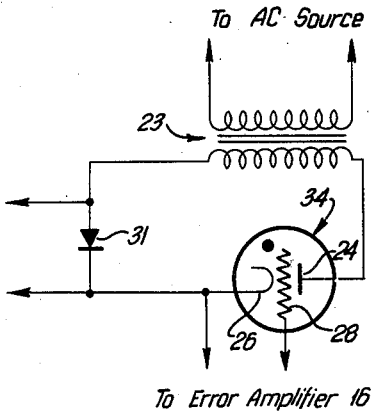
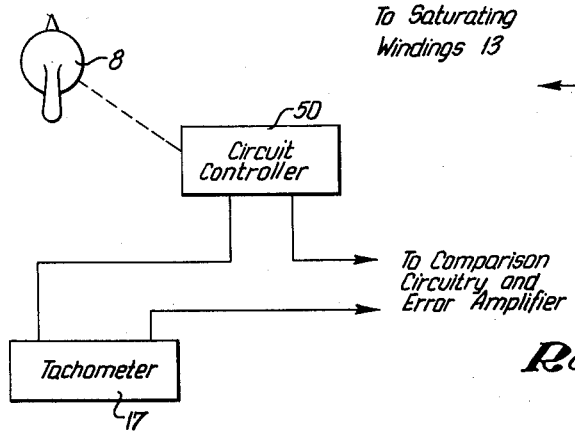
INVENTOR.
ROBERT J. CARLSON
BY
Flam and Flam
ATTORNEYS.

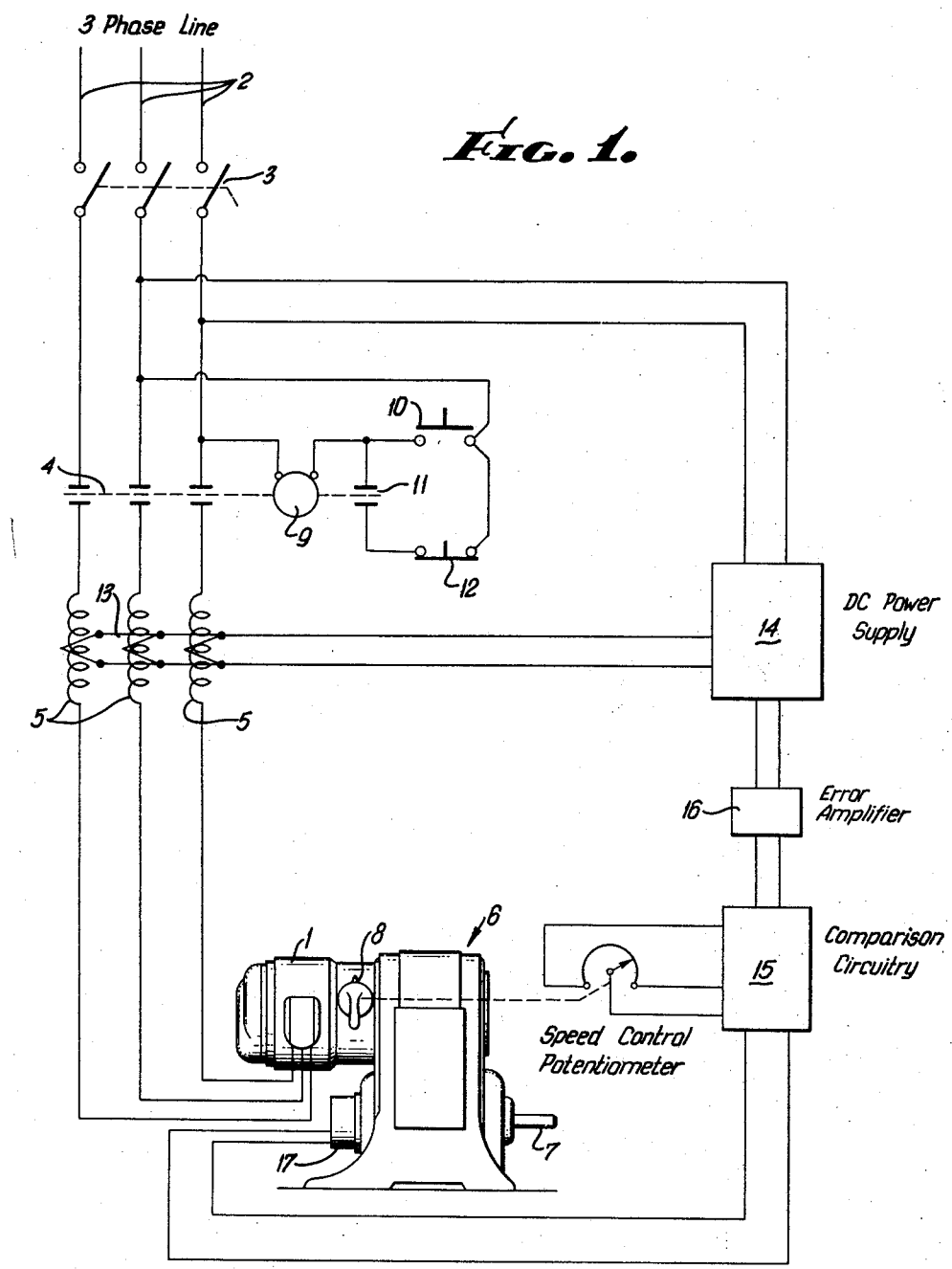

March 17, 1964      R. J. CARLSON      3,125,711
SPEED CONTROLLER FOR INDUCTION MOTOR Filed June 27, 1960      3 Sheets-Sheet 3

INVENTOR.
ROBERT J. CARLSON
BY
Flam and Flam
ATTORNEYS.

United States Patent Office 3,125,711
Patented Mar. 17, 1964

3,125,711
SPEED CONTROLLER FOR INDUCTION MOTOR
Robert J. Carlson, Milford, Conn., assignor, by mesne assignments, to The Emerson Electric Manufacturing Company, St. Louis, Mo., a corporation of Missouri
Filed June 27, 1960, Ser. No. 38,813
15 Claims. (Cl. 318—11)

This invention relates to speed control for electrical motors, such as induction motors. More particularly, the invention provides a wide speed range without substantial sacrifice of overall efficiency at the low speeds.

The invention is particularly concerned with a drive requiring a constant torque and in which the speed required by the load is adjusted by the aid of a variable ratio transmission device interposed between the motor and the load. An example of such a transmission device is illustrated in a Patent No. 2,398,235, issued on April 6, 1946, in the name of Frederick O. Luenberger.

The power delivered by the motor is proportional to the product of speed and torque. Obviously, as the speed is set below maximum, the power required to operate a load at constant torque is reduced proportionately to the reduction in speed.

In the prior systems, the motor shaft speed remained substantially constant, the entire speed variation being effected by the variable ratio transmission device, adjusted by aid of a handwheel.

It is one of the objects of this invention to provide a system in which the lower portion of the speed range is augmented by causing the motor to operate at a speed less than under full line voltage, as by the aid of a variable impedance. By thus reducing the applied voltage, the motor runs on reduced current; and this renders the operation of the motor more efficient at low loads.

It is another object of this invention to make it possible to render the speed adjustment to be proportional to the movement of the handwheel, especially at the lower end of the speed range.

In order to accomplish these results, an adjustable reactance in the motor leads may be utilized, which may be increased at the low range, and decreased in the high range. The adjustment may be effected in discontinuous steps or in a continuous manner, and in accordance with the position of the ratio determining element of the variable ratio transmission mechanism.

For example, the adjustment of the reactance or reactances may be effected by adjusting the current passing through a saturating direct current winding mounted on the core of the reactance or reactances. In one form of the invention, but one circuit controlling device is used to change the impedance from a high to a low value after a definite low speed of the output is passed. This circuit controller may be a thyratron, or a mechanically operated switch.

It is still another object of this invention to improve in general the efficiency of the motor performance over the complete range of speed adjustment.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a diagrammatic representation of a system incorporating the invention;

FIGS. 2, 3 and 4 are circuit diagrams of various components of the system shown in FIG. 1;

FIG. 5 is a diagrammatic representation of a modified form of the invention.

Figure 6:
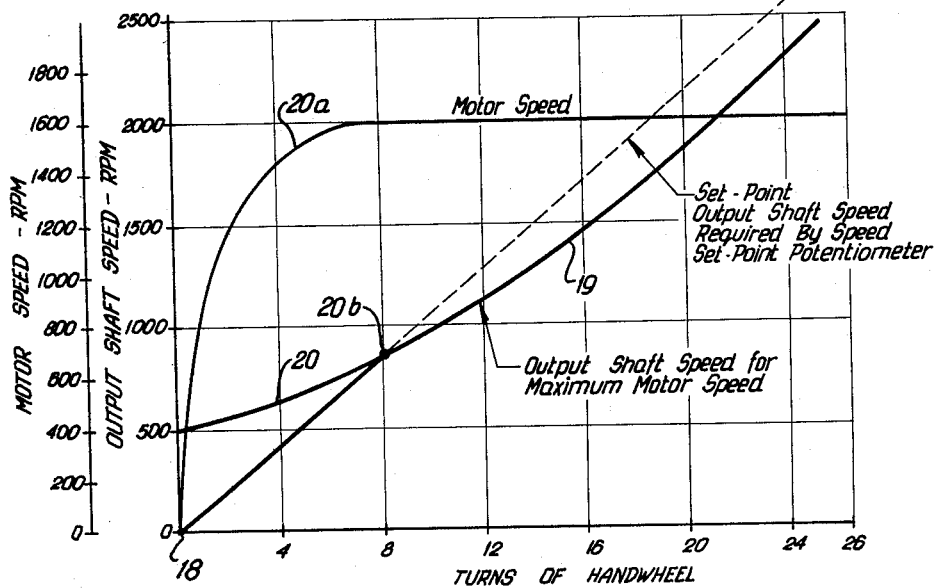
FIGS. 6 and 7 are graphs illustrating the performance of the system.

In FIG. 1, an induction motor 1 is fed from the mains 2 through a main switch 3, a starting switch 4, and variable series impedances 5 respectively in the leads of the three-phase system. These variable impedances may be saturable reactors.

The motor 1 drives a variable ratio transmission mechanism 6, having an output shaft 7 adapted to drive a load. A handwheel 8 is provided for operating the transmission mechanism 6 so as to vary its ratio. This mechanism may be of the type illustrated in the former patent issued in the name of Frederick O. Luenberger, hereinabove identified.

It is the purpose of this system to cause the output shaft 7 to start from substantially zero speed up to full speed, in proportion to the turns of the handwheel 8, and by proper control of the line voltage supplied to motor 1. This control, as hereinafter described, is effected by adjusting the effective value of the reactance of series reactors 5.

Conventional starting and stopping push-button controls may be provided. For example, starting switch 4 is operated by an electromagnet 9. This electromagnet, when energized by operating the start button 10, serves to close the switch 4. The electromagnet 9 also closes the holding contacts 11 so that the start button may be released without deenergizing the electromagnet 9.

The stop button 12 serves to deenergize electromagnet 9 and thus to open switch 4.

The reactors 5 are provided with direct current windings 13 so as to provide degrees of saturation. The current supplied to these windings 13 is regulated to adjust the effective impedance of these reactors in a prescribed manner as hereinafter described.

The D.C. power supply 14 for the windings 13 is under the control of a comparison circuitry 15 which compares the ratio setting of the transmission 6 with the speed of the motor 1 or of the output shaft 7. As the handwheel 8 is turned to adjust the speed of shaft 7, the saturable reactors are also varied by adjustment of the energization of the windings 13. As the speed of shaft 7 increases, the energization of windings 13 also increases. An amplifier 16 is interposed between the comparison circuitry 15 and the D.C. power supply 14. Furthermore, in the form shown in FIG. 1, the tachometer 17 serves to provide an alternating current electromotive force corresponding to the output speed of the shaft 7; and therefore, this electromotive force is a measure of the output speed.

Assuming that motor 1 would be energized by full line voltage and without the interposition of reactors 5, the output speed in relation to the turns of handwheel 8 is typically represented by curve 19—20 of FIG. 6. It is thus seen that the minimum speed at the output shaft 7 is quite large, of the order of twenty percent of the maximum motor speed.

In order to obtain lower speeds than that permitted by the variable ratio transmission 6, the low speeds of the output are obtained by using the saturable reactors 5. At low speeds, the reactors 5 have a high reactance. The degree of energization of the windings 13 is affected by the position of the handwheel 8. With handwheel 8 calling for minimum speed, the reactances are so high that the output speed is substantially zero, represented by point 18. As the handwheel continues to higher speed positions, the saturable reactors are gradually saturated, until their reactances are reduced to a limiting low value, corresponding to complete saturation.

As shown in FIG. 6, as the handwheel is turned, the motor speed increases, as indicated by curve 20a, due to the reduction in the reactance of the reactors 5. After the reactance has been reduced to substantially zero, corresponding to an intermediate part of the output shaft speed curve, the saturating windings 13 are fully energized. Therefore, reactance is no longer effective to increase the speed of the motor. The motor speed thereafter is at a consistently high value beyond this point. Accordingly, the speed of the output shaft 7 is determined thereafter solely by operation of the handwheel 8, this portion 19 of the curve showing the resulting output speed.

As heretofore stated, had the saturable reactor arrangement been omitted from the system, the output shaft speed would correspond to the lower part of the curve 20. Under such circumstances, the motor speed being at a maximum at all times, the minimum speed would be substantially above standstill. Accordingly, by the aid of the saturable reactor controls, the minimum speed can be reduced to substantially zero.

Thus, beyond eight turns of the handwheel from the starting or low speed position, the handwheel position alone determines the output speed of the transmission mechanism shaft 7, as indicated by the upper portion of curve 20 beyond point 20b. Below eight turns, the control is affected by adjustment of the direct current energization of the windings 13. The combined speed curve from zero to maximum setting of handwheel 8 thus corresponds to the discontinuous curve 18—20b—19. This curve, however, approximates a straight line passing through origin, whereby the speed is made substantially proportional to the angular movement of handwheel 8.

Two forms of the direct current power supply 14 are illustrated in FIGS. 2 and 3.

Thus, in FIG. 2, a power amplifier 22 is shown as having an anode 24, a cathode 26 and a control electrode or grid 28. The input circuit is connected to the error amplifier 16. The output circuit is connected directly to the saturating windings 13. The plate potential is obtained from a transformer 23.

Depending upon the potential difference between the electrodes 26 and 28, the output current from the power amplifier 22 is adjusted.

If desired, a rectifier 30 (diagrammatically shown) may be interposed in the output circuit, and any form of filter means could be utilized, such as a condenser 32. A shunting unidirectional conductor 31 is connected across the direct current windings to permit the current to flow from the direct current windings 13 upon deenergization of amplifier 22.

In certain instances, the change of excitation for the saturating windings may be discontinuous, as from a maximum to a minimum, or vice versa. A thyratron circuit for this purpose is illustrated in FIG. 3. In this form of the invention, a thyratron 34 is adapted to be triggered when the signal coming from the error amplifier 16 is sufficient to fire the thyratron. Here the thyratron 34 merely acts as a switch which changes the reactance of reactors 5 from a substantially high value to a very much lower value when it is desired that the motor 1 attain full speed.

The comparison circuitry 15 is illusrated in FIG. 4. In this figure, there are two potentiometer resistors 40 and 42. Resistor 42 is supplied with current from an appropriate direct current source, such as battery 45. Intermediate adjustable taps 44 and 46 are provided respectively for these resistors. The arrangement is such that the potential of grid 28 (FIG. 2 or FIG. 3) corresponds to the difference between two potentials. One is the positive potential between the right-hand terminal of resistor 42 and tap 46. The other is the negative potential between the tap 44 and the left-hand terminal of resistor 40. The tachometer 17 provides direct current for the potentiometer resistor 40 through a rectifier and filter 48. The tap 44 is manually adjusted to determine when or at what position of the handwheel 8 the saturating windings 13 may be fully energized. This adjustable tap 44 is connected to the input circuit of the amplifier 16. The other terminal of the input circuit includes a portion of the resistor 42, as determined by the moving potentiometer tap 46 mechanically coupled to the handwheel 8. As the handwheel 8 moves in a direction to increase the speed, the resultant potential difference between the input electrodes of the amplifier 16 is gradually increased from a negative value to a positive value. As it becomes more and more positive due to continued operation of the handwheel 8, the greater becomes the saturation current through the windings 13. After complete saturation, the reactors 5 no longer influence the output speed, and only movement of the handwheel 8 is effective. This corresponds to point 20b in FIG. 6.

In order to obtain the full range of speed, the induction motor 1 is purposely chosen to have a relatively high slip. The speed regulation for the minimum reactance for the saturable reactors 5 is therefore relatively poor. This is due to the fact that the higher speeds are controlled solely by operation of the handwheel 8, and the set-point control is no longer effective.

Figure 7:
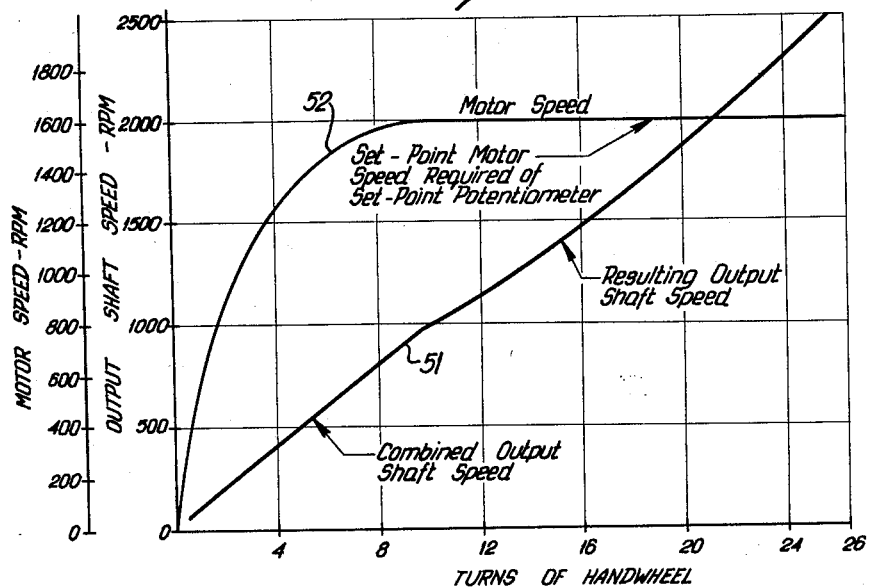

In order to make it possible to provide better regulation throughout the entire speed range, the tachometer 17 may be connected to the motor shaft, to be responsive to motor speed. Under such circumstances, the motor speed is continuously under the control of the controlling circuits. The curves of FIG. 7 illustrate the resultant performance. In order to make it possible to obtain substantially the straight-line curve 51 for the output speed of the shaft 7, the potentiometer resistor 42, which is fed from the battery 45, is wound so that its resistance as a function of the angular position of tap 46 (FIG. 4) is non-linear. The motor speed curve 52, resulting from the non-linearity, is such as to produce the resulting speed curve 51 at the output shaft 7. As the handwheel 8 is turned to higher speeds, the potentiometer 42 produces a positive potential above that provided by a linear resistor.

In the form of the invention illustrated in FIG. 5, a circuit controller 50 is operated when the handwheel 8 is at a definite position. This circuit controller at this point activates the direct current windings. The current througs the windings then controls the impedance. Thus, above a definite number of handwheel turns, the reactors 5 have reduced reactance values. The resultant output speed curve is thus discontinuously altered.

The inventor claims:

1. In a control system for adjusting the speed of a power drive: an alternating current motor the speed of which depends upon the voltage applied to the motor; a variable ratio transmission mechanism driven by the motor and having a rotary power output; movable means for determining the ratio of the mechanism between limits from a low output to input ratio to a high output to input ratio, and in accordance with the position of the movable means; and means correlated with the position of the movable means for reducing the voltage applied to the motor below line voltage when the ratio is set at a low value for producing low motor speed in combination with low transmission ratio to achieve a low output speed.

2. In a speed control syetem: an alternating current motor; a variable ratio transmission mechanism driven by the motor and having a rotary output; means for adjusting the ratio of the mechanism between limits from low speed to high speed of the output; means for reducing the voltage applied to the motor below line voltage; and means responsive to the arrival of the adjusting means at an intermediate point, from low to high speed, for increasing the voltage applied to the motor to substantially line voltage.

3. In a speed control system: an alternating current motor the speed of which depends upon the voltage applied to the motor; a variable ratio transmission mechanism driven by the motor and having a rotary power output; movable means for determining the ratio of the mechanism between limits from a low output to input ratio to a high output to input ratio, and in accordance with the position of the movable means; and means for continuously adjusting the voltage applied to the motor as a function of the position of the movable means so as gradually to increase said voltage as the ratio of transmission is increased.

4. In a control system for adjusting the speed of a power drive: an alternating current motor; a variable ratio transmission mechanism driven by the motor and having a rotary power output; means for adjusting the ratio of the transmission mechanism between limits from low speed to high speed of the output; and means for reducing the voltage applied to the motor below line voltage, comprising a reactor having a direct current saturating winding.

5. The combination as set forth in claim 2, in which the means to reduce the voltage is a reactor having a direct current saturating winding.

6. In a speed control system: an alternating current motor; a variable ratio transmission mechanism driven by the motor and having a rotary power output; means for adjusting the ratio of the transmission mechanism between limits from low speed to high speed of the output; and means for continuously adjusting the voltage applied to the motor so as gradually to increase said voltage when moving the mechanism adjusting means in the direction to increase the speed, comprising a reactor having a direct current saturating winding.

7. In a speed control sytem: an alternating current motor; a variable ratio transmission mechanism driven by the motor and having a rotary output; means for adjusting the ratio of the mechanism between limits from low speed to high speed of the output; means for reducing the voltage applied to the motor below line voltage; means responsive to the output speed of the transmission mechanism for increasing the voltage applied to the motor to substantially full line voltage upon attainment of an intermediate speed of the output.

8. In a speed control system: an alternating current motor; a variable ratio transmission mechanism driven by the motor and having a rotary output; means for adjusting the ratio of the mechanism between limits from low speed to high speed of the output; means for reducing the voltage applied to the motor below line voltage; means responsive to the output speed of the transmission mechanism for continuously adjusting the voltage applied to the motor, in such sense that as the output speed increases, the voltage is increased.

9. The combination as set forth in claim 8, in which the full line voltage is achieved at an intermediate point of the ratio of transmission.

10. In a speed control system: an alternating current motor; a variable ratio transmission mechanism driven by the motor and having a rotary output; means for adjusting the ratio of the mechanism between limits from low speed to high speed of the output; and means for adjusting the voltage applied to the motor in response to the adjustment of the ratio to an intermediate value, the sense of the adjustment of the voltage such as to increase the voltage upon an increase in output speed, said voltage adjusting means including a circuit controller operated by the adjusting means for the mechanism.

11. The combination as set forth in claim 10, with the addition of means for increasing the applied voltage to a maximum as the output speed increases.

12. In a speed control system: an alternating current motor; a variable ratio transmission mechanism driven by the motor and having a rotary output; means for adjusting the ratio of the mechanism between limits from low speed to high speed of the output; means for reducing the voltage applied to the motor below line voltage; means responsive to the speed of the motor for continuously increasing the voltage applied to the motor as the motor speed increases.

13. In a speed control system: an alternating current motor; a variable ratio transmission mechanism driven by the motor and having a rotary output; means for adjusting the ratio of the mechanism between limits from low speed to high speed of the output; means for reducing the voltage applied to the motor below line voltage; means responsive to the speed of the motor for continuously increasing the voltage applied to the motor as the motor speed increases, in such manner as to cause the output speed to vary substantially linearly in response to the extent of movement of the mechanism adjustment means.

14. In a control system for adjusting the speed of a power drive: an alternating current motor the speed of which is a function of applied voltage; a variable ratio transmission mechanism driven by the motor and having a rotary power output; movable means for determining the ratio of the mechanism between limits from a low output to input ratio to a high output to input ratio, and in accordance with the position of the movable means; a servo system for said motor and transmission, including means for producing a reference signal linearly proportional to the position of said movable means, means for producing a signal corresponding to rotational speed at the output of said variable ratio transmission, means comparing the said signals for producing an error signal, and means, including a saturable reactor for adjusting the amplitude of excitation of said motor in accordance with said error signal for changing the speed at the output of said transmission for reducing the said error signal.

15. In a speed control system: an alternating current motor; a variable ratio transmission mechanism driven by the motor and having a rotary output; means for adjusting the ratio of the mechanism between limits from low speed to high speed of the output; means for reducing the voltage applied to the motor below line voltage; means responsive to the speed of the motor for continuously increasing the voltage applied to the motor as the motor speed increases, in such manner as to cause the output speed to vary substantially linearly in response to the extent of movement of the mechanism adjustment means, including a saturable reactor in the motor circuit; a saturating direct current winding for the reactor; means deriving a direct current potential difference corresponding to the speed of the motor; a potentiometer resistance to which said potential difference is applied; an adjustable tap for said resistance; a second potentiometer resistance having an adjustable tap corresponding to the speed ratio adjustment, said second resistance being nonlinear; the potential corresponding to the two taps being opposed, to provide a differential potential; and means deriving a saturating current corresponding to said differential potential.

References Cited in the file of this patent

UNITED STATES PATENTS

| | | |
|---|---|---|
| 2,444,171 | Sanders | June 29, 1948 |
| 2,518,580 | Trofimov | Aug. 15, 1950 |
| 2,610,315 | McKendry et al. | Sept. 9, 1952 |
| 2,693,563 | Hunt | Nov. 2, 1954 |
| 2,735,059 | Schaelchlin | Feb. 14, 1956 |
| 2,824,271 | Anderson et al. | Feb. 18, 1958 |
| 2,864,040 | Trotsky | Dec. 9, 1958 |
| 3,045,153 | Carlson | July 17, 1962 |

FOREIGN PATENTS

| | | |
|---|---|---|
| 190,763 | Austria | July 25, 1957 |